(12) United States Patent
Cho

(10) Patent No.: US 8,267,367 B2
(45) Date of Patent: Sep. 18, 2012

(54) VACUUM PAD DEVICE

(75) Inventor: Ho-Young Cho, Gwangmyeong-si (KR)

(73) Assignee: Korea Pneumatic System Co., Ltd., Seoul (KR)

( * ) Notice: Subject to any disclaimer, the term of this patent is extended or adjusted under 35 U.S.C. 154(b) by 231 days.

(21) Appl. No.: 12/736,125

(22) PCT Filed: Mar. 16, 2009

(86) PCT No.: PCT/KR2009/001288
§ 371 (c)(1),
(2), (4) Date: Sep. 10, 2010

(87) PCT Pub. No.: WO2009/116761
PCT Pub. Date: Sep. 24, 2009

(65) Prior Publication Data
US 2011/0001024 A1      Jan. 6, 2011

(30) Foreign Application Priority Data

Mar. 17, 2008  (KR) .................. 10-2008-0024327

(51) Int. Cl.
*A45D 42/14* (2006.01)
*B25J 15/06* (2006.01)

(52) U.S. Cl. ....... 248/363; 248/205.9; 294/65; 294/183; 294/185; 294/189; 294/907

(58) Field of Classification Search .............. 248/205.9, 248/363; 294/64.2, 65, 183, 185, 189, 907
See application file for complete search history.

(56) References Cited

U.S. PATENT DOCUMENTS

| 3,152,828 A |   | 10/1964 | Lytle |
|---|---|---|---|
| 3,223,442 A |   | 12/1965 | Fawdry et al. |
| 3,272,549 A |   | 9/1966 | Nisula |
| 3,568,959 A |   | 3/1971 | Blatt |
| 3,613,904 A |   | 10/1971 | Blatt |
| 3,967,849 A | * | 7/1976 | Cagle ................... 294/64.2 |
| 4,600,228 A |   | 7/1986 | Tarbuck |
| 4,747,634 A |   | 5/1988 | Hoke |
| 4,957,318 A |   | 9/1990 | Blatt |

(Continued)

FOREIGN PATENT DOCUMENTS

JP         07-214488        8/1995

(Continued)

OTHER PUBLICATIONS

International Search Report with Written Opinion.

(Continued)

*Primary Examiner* — Anita M King
(74) *Attorney, Agent, or Firm* — Larkin Hoffman Daly & Lindgren, Ltd.; Robert C. Klinger

(57) ABSTRACT

The present invention relates to a vacuum pad device used in a vacuum transport system. The pad device includes a housing, a pad unit connected to the housing through a ball joint such that the pad unit is rotatable, and a piston arranged in the housing and controlling the rotation of the pad unit. The pad unit is bonded to an object at a desirable rotation angle, and controlled such that the rotation angle is fixed by the movement of a piston operating via compressed air. Consequently, the object can be transported in an accurate and safe manner. Preferably, the vacuum pad device of the present invention further includes a vacuum pump arranged in the housing unit the piston.

6 Claims, 4 Drawing Sheets

U.S. PATENT DOCUMENTS

| | | | |
|---|---|---|---|
| 5,029,383 A | 7/1991 | Snyder et al. | |
| 5,544,968 A * | 8/1996 | Goellner | 403/31 |
| 5,611,258 A | 3/1997 | Matuo et al. | |
| 6,024,392 A | 2/2000 | Blatt et al. | |
| 6,213,521 B1 | 4/2001 | Land et al. | |
| 6,454,333 B2 | 9/2002 | Portal | |
| 6,502,877 B2 | 1/2003 | Schick et al. | |
| 7,281,739 B2 | 10/2007 | Kniss | |
| 7,665,783 B2 * | 2/2010 | Nishio | 294/188 |
| 8,113,560 B2 * | 2/2012 | Sone | 294/183 |

FOREIGN PATENT DOCUMENTS

| | | |
|---|---|---|
| JP | 08-128434 | 5/1996 |
| JP | 08-197470 | 8/1996 |
| JP | 10-249770 | 9/1998 |
| WO | WO 90/05694 | 5/1990 |

OTHER PUBLICATIONS

International Preliminary Examination Report.

\* cited by examiner

VACUUM PAD DEVICE

BACKGROUND OF THE INVENTION

1. Field of the Invention

The present invention relates generally to vacuum pad devices used in vacuum transport systems and, more particularly, to a vacuum pad device which is configured such that a suction pad is rotated using a ball joint to easily cope with different surface angles of an object.

2. Description of the Related Art

Generally, vacuum transport systems form negative pressure in a pad device using a vacuum pump which uses compressed air, and holds an object using the pad device to which the negative pressure is applied, and then transports the object to a desired place.

The pad device used in these vacuum transport systems typically includes a rigid body and a flexible suction pad. The rigid body is generally connected to a suction port of a vacuum pump, and the suction pad is fixed to the end of the rigid body. When compressed air passes through the vacuum pump, air which has been in the suction pad is drawn into the vacuum pump and then the air, along with the compressed air, is discharged out of the vacuum pump. Thereby, negative pressure is formed in the suction pad.

However, in this conventional structure, because the suction pad is fixed to the end of the rigid body such that the axis of the suction pad is parallel to the axis of the rigid body, the surface under suction that is in contact with the suction pad is always perpendicular to the rigid body. Therefore, if the surface of an object is not perpendicular to the axis of the rigid body, the suction pad cannot directly cope with the inclined surface of the object.

In an effort to overcome the above problem, a pad device was proposed, in which a bellows pipe or a ball joint is provided between a rigid body and a suction pad.

In this structure, the suction pad is rotatably coupled to the rigid body by the bellows pipe or the ball joint. Therefore, the suction contact surface of the suction pad can be oriented in a variety of directions and angles relative to the rigid body, rather than being limited to the perpendicular state.

In other words, the suction pad can freely rotate with respect to the rigid body because of the bellows pipe or the ball joint. Therefore, the suction pad can immediately cope with even an inclined surface of the object that is not perpendicular to the longitudinal axis of the rigid body. That is, when the suction pad is attached to the inclined surface of the object, the suction pad is bent with respect to the rigid body at an angle and in a direction corresponding to the inclined surface.

However, when the suction pad which has been attached to the object lifts the object to transport it to a desired place, the suction pad is rotated by the load of the object. Hence, precisely and safely transporting the object to the desired place becomes very difficult.

To reliably realize application, installation, loading, etc. of the object, conditions, such as the orientation, angle, arrangement, etc. of the object before it is transported should be maintained not only when it is being transported but also after having been transported. However, when and if the suction pad is rotated when being transported, the orientation, angle, etc. of the object are changed during the transportation, and thus the above-mentioned requirements are not met.

Moreover, if the object rotates when being transported, the object may become detached from the suction pad because of the load of the object and the rotational force applied thereto.

SUMMARY OF THE INVENTION

Accordingly, the present invention has been made keeping in mind the above problems occurring in the prior art, and an object of the present invention is to provide a vacuum pad device which is configured such that:

(1) a suction pad can rotate with respect to the housing;

(2) even when the suction pad lifts an object after the pad has been attached to the object, the orientation of the suction pad relative to the housing can be maintained; and (3) the object can be precisely and safely transported.

Another object of the present invention is to provide a vacuum pad device which includes a vacuum pump so that a vacuum transport system including the vacuum pad device can have a compact structure.

In order to accomplish the above object, the present invention provides a vacuum pad device, including a housing, a pad unit coupled to the housing so as to be rotatable, and a piston installed in the housing to control rotation of the pad unit. Preferably, the vacuum pad device of the present invention further includes a vacuum pump provided in the housing by the housing and the piston. The details are as follows.

The housing has an inlet port and an outlet port which are respectively formed through the sidewall of the housing at an upper position and a lower position, a mounting seat which is formed through the lower end of the housing, and a sealing cover which is provided on the upper end of the housing. The pad unit includes a ball joint having a through hole formed in a longitudinal direction thereof, and a suction pad coupled to the end of the ball joint. A ball of the ball joint is seated into the mounting seat of the housing so that the pad unit is rotatably coupled to the housing.

The piston is provided in the housing such that the outer surface of the piston is in close contact with the inner surface of the sidewall of the housing. The piston has a connection hole communicating with the outlet port with the through hole. The pressure of compressed air supplied from the inlet port moves the piston in the longitudinal direction of the housing, thus controlling rotation of the ball joint to prevent the pad unit from undesirably rotating when the object is transported. Preferably, the piston comes into surface contact with the ball of the ball joint, and the ball is pressed by the longitudinal movement of the piston, thereby restricting the rotation of the pad unit.

The vacuum pump comprises an axis-symmetric air pump. The vacuum pump has an air intake hole formed in a first end thereof, an air discharge hole formed in a second end thereof, and an opening formed through the sidewall of the vacuum pump to communicate with outside air. The vacuum pump is mounted to the housing in such a way that a mounting hole is formed in the housing at a position opposite to the outlet port and the first end and the second end of the vacuum pump are respectively inserted into the mounting hole and the outlet port. The opening of the vacuum pump communicates with the connection hole of the piston.

In a vacuum pad device according to the present invention, a pad unit can rotate at a desired angle with respect to the housing before it is attached to an object. The angle at which the pad unit rotates with respect to the housing can be maintained by moving a piston which is operated by compressed air. Therefore, the object can be precisely and safely transported. Furthermore, the vacuum pad device of the present invention includes a vacuum pump, so that a vacuum transport system including the vacuum pad device can have a compact structure.

Figure 1:
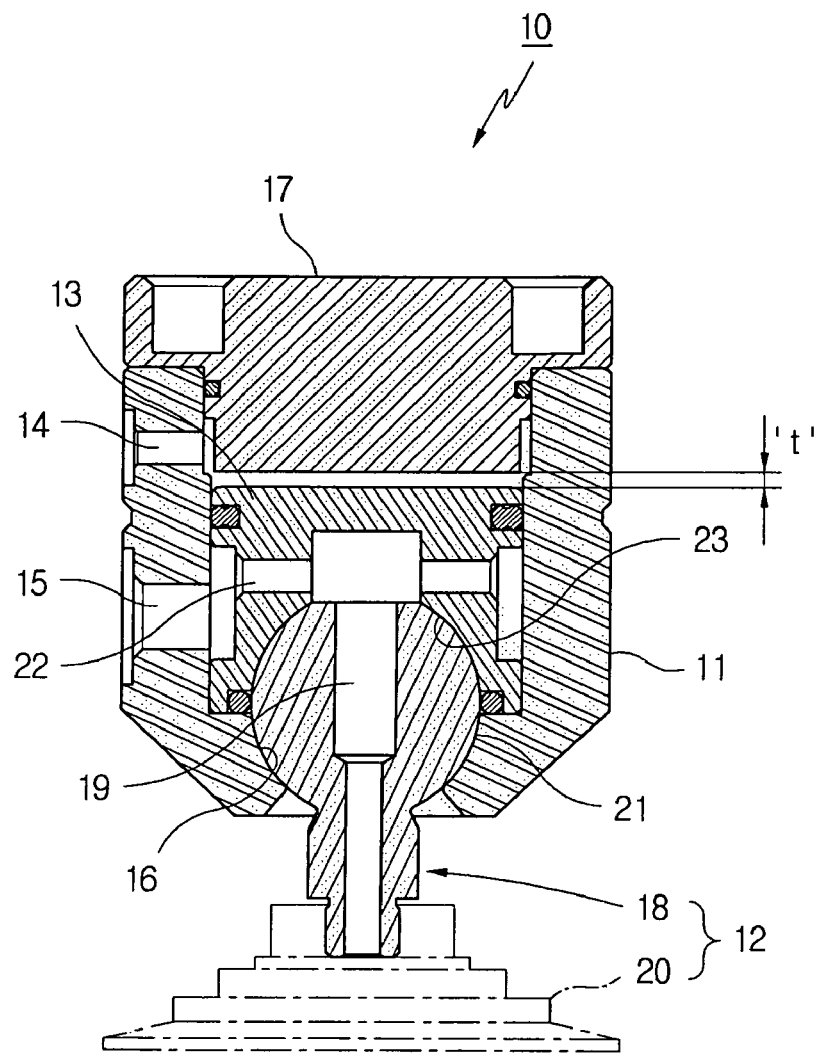
FIG. 1 is a sectional view showing an embodiment of a vacuum pad device, according to the present invention.

DESCRIPTION OF THE ELEMENTS IN THE DRAWINGS 10, 30: vacuum pad device 11: housing
12: pad unit 13: piston
14: inlet port 15: outlet port
16: mounting seat 17: sealing cover
18: ball joint 19: through hole
20: suction pad 21: ball
22: connection hole 31: vacuum pump
32: air intake hole 33: air discharge hole
34: opening 38: pin

DESCRIPTION OF THE PREFERRED EMBODIMENTS

The above and other objects, features and advantages of the present invention will be more clearly understood from the following detailed description taken in conjunction with the accompanying drawings.

First Embodiment

Referring to FIG. 1, a vacuum pad device according to the present invention is designated by reference numeral 10. The pad device 10 includes a housing 11, a pad unit 12 which is rotatably coupled to the housing 11, and a piston 13 which is installed in the housing 11 to control rotation of the pad unit 12.

The housing 11 has a hollow structure which is open on an upper end thereof. An inlet port 14 and an outlet port 15 are respectively formed through upper and lower positions of the sidewall of the housing 11. A mounting seat 16 is formed in a lower end of the housing 11. The upper end of the housing 11 is sealed with a sealing cover 17.

The pad unit 12 includes a ball joint 18 and a suction pad 20. A through hole 19 is formed through the ball joint 18 along a longitudinal direction of the ball joint 18. The suction pad 20 is coupled to an end of the ball joint 18. The pad unit 12 is rotatably coupled to the housing 11 in such a way that a ball 21 of the ball joint 18 is seated into the mounting seat 16 of the housing 11.

It is desirable that the mounting seat 16 has a round surface which is in surface contact with the ball 21 of the ball joint 18. Thereby, the ball joint 18 can be reliably maintained in the mounting seat 16 so as to be rotatable.

The piston 13 has therein a connection hole 22 which communicates with the outlet port 15 with the through hole 19. The piston 13 comes into close contact with the inner surface of the housing 11. A slight gap t is formed between a head surface of the piston 13 and the cover 17 to allow the piston 13 to move in a longitudinal direction of the housing 11.

Furthermore, a lower portion of the piston 13 comes into contact with the ball 21 of the ball joint 18. When compressed air is supplied into the inlet port 14, the pressure of the compressed air moves the piston 13 downwards, thus pressing the ball 21 of the ball joint 18. The force with which the piston 13 presses the ball 21 prevents the ball joint 18 and the pad unit 12 from undesirably moving when an object is transported.

In this embodiment, although the piston 13 has been illustrated as being constructed such that it comes into direct contact with the ball 21 of the ball joint 18 and presses the ball 21 depending on movement of the piston 13 to control rotation of the ball joint 18 and the pad unit 12, various control methods can be used, for example, an electronic brake system, or an indirect contact pressing method on the assumption that the ball 21 is controlled by the movement of the piston 13, etc.

Preferably, the piston 13 has a round recess 23 such that the piston 13 makes surface contact with the ball 21 of the ball joint 18. Thereby, the ball joint 18 is directly pressed by the piston 13, and comparatively large frictional resistance occurs between the ball joint 18 and the piston 13. Hence, the ball joint 18 can be reliably restricted from undesirably rotating.

Figure 2:
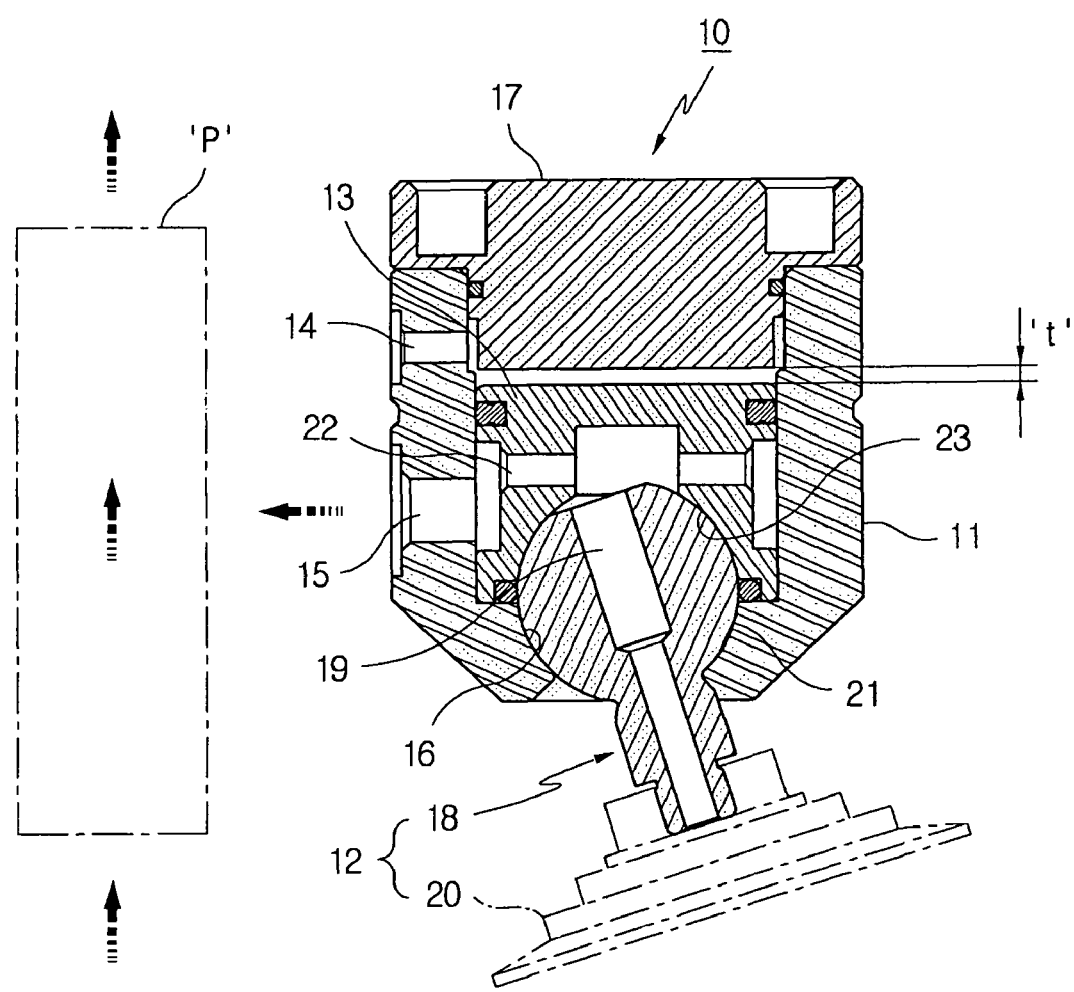
FIG. 2 is a view showing the operation of the vacuum pad device of FIG. 1.

Referring to FIG. 2, to construct a vacuum system including the pad device 10, a separate vacuum pump P is provided. The outlet port 15 of the housing 11 is connected to a suction port of the vacuum pump P. Compressed air is supplied into the vacuum pump P or the inlet port 14 of the housing 11. A path along which compressed air is supplied is selectively controlled by an electronic valve.

The pad device 10 of the present invention is configured such that the pad unit 12 is rotatable with respect to the housing 11. Therefore, on the assumption that the pad unit 12 is oriented in a predetermined direction and angled to the housing 11 at a predetermined angle (rotation angle), the operation of the pad device 10 when the object is transported will be explained below.

When compressed air passes through the vacuum pump P at high speed, air which has been in the suction pad 20 is drawn into the vacuum pump P via the through hole 19 and the connection hole 22 by the high speed compressed air and then the air, along with the compressed air, is discharged out of the vacuum pump P. During this process, a vacuum is created in the vacuum pump P and a negative pressure is formed in the suction pad 20.

Thereafter, when the intensities of the vacuum and negative pressure become strong enough to transport the object, compressed air is supplied into the inlet port 14 to press the head surface of the piston 13. Then, the piston 13 moves downwards and presses the ball 21 of the ball joint 18. Thereby, strong frictional force is generated between the piston 13 and the ball joint 18.

From this state, transportation of the object begins. Because there is a strong friction force acting between the piston 13 and the ball joint 18, the angle which was set between the housing 11 and the pad unit 12 before the transportation of the object begins can be maintained when the object is being transported. Accordingly, the object can be precisely and safely transported.

Second Embodiment

Figure 3:
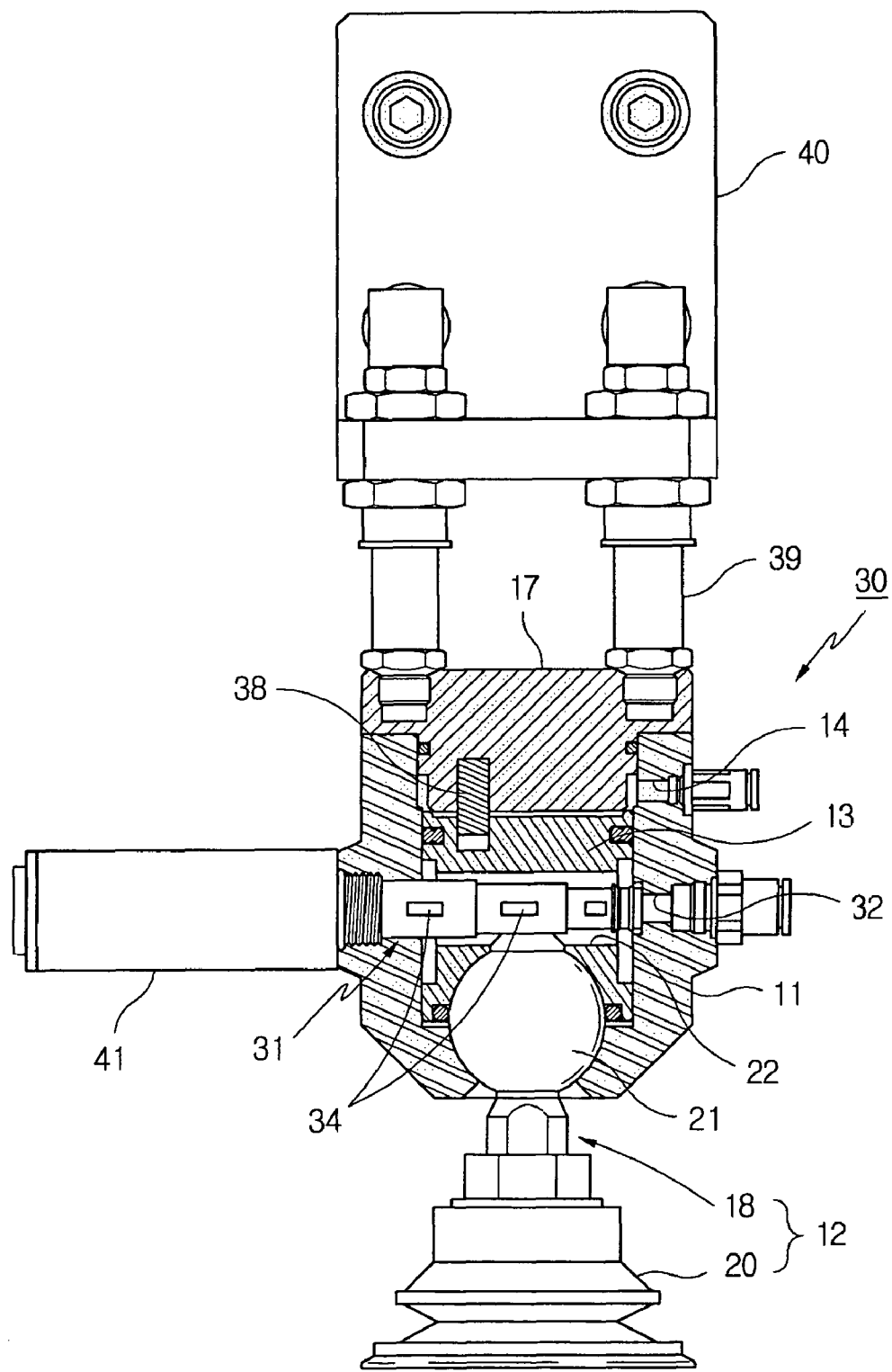
FIG. 3 is a sectional view showing another embodiment of a vacuum pad device, according to the present invention.

Referring to FIG. 3, a vacuum pad device according to a second embodiment of the present invention is designated by reference numeral 30. The vacuum pad device 30 further includes a vacuum pump 31 as well as including a housing and a piston which have the same functions as those of the first embodiment. Therefore, the same reference numerals are used in FIG. 3 to designate the components having functions or constructions equal to or similar to those of the first embodiment. Description of the same constructions and functions as those of the first embodiment is deemed unnecessary.

Figure 4:
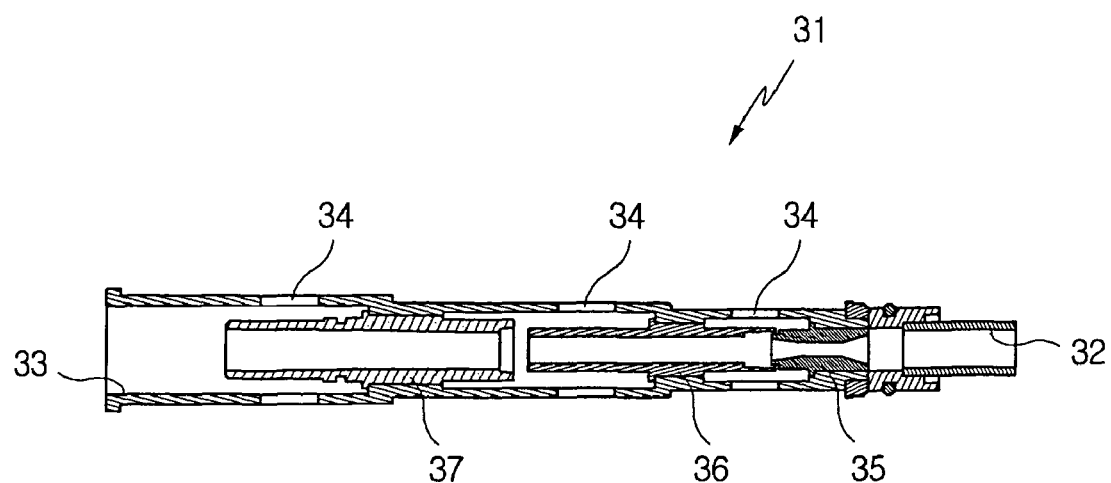
FIG. 4 is a sectional view of a vacuum pump used in the vacuum pad device of FIG. 3.

Referring to FIG. 4, the vacuum pump 31 is an axis-symmetric air pump. An air intake hole 32 is formed in a first end of the vacuum pump 31, and an air discharge hole 33 is formed in a second end thereof. A plurality of openings 34 which communicate with the outside air is formed through the outer surface of the vacuum pump 31. In the same manner as do typical pumps, multiple nozzles 35, 36 and 37 are arranged in series in the vacuum pump 31. However, the vacuum pump 31 of the present invention should not be construed as being limited to this type of pump.

As shown in FIG. 3, the vacuum pump 31 is mounted to the housing 11 in such a way that a mounting hole is formed in the housing 11 at a position opposite to the outlet port (15 of FIG. 1) and then the opposite ends of the vacuum pump 31 in which the air intake hole 32 and the air discharge hole 33 are formed are respectively inserted into the mounting hole and the outlet port. The openings 34 of the vacuum pump 31 communicate with the connection hole 22 of the piston 13.

Compressed air is supplied into the air intake hole 32 and discharged out of the air discharge hole 33 after passing through the vacuum pump P at high speed. Then, air which has been in the suction pad 20 is drawn into the vacuum pump 31 via the through hole 19, the connection hole 22 and the openings 34 by the high speed compressed air. Thereafter, the air, along with the compressed air, is discharged out of the vacuum pump 31. During this process, vacuum is created in the vacuum pump 31 and a negative pressure is formed in the suction pad 20.

Subsequently, when the intensities of the vacuum and negative pressure become strong enough to transport the object, compressed air is supplied into the inlet port 14 to press the head surface of the piston 13. Then, the piston 13 moves downwards and presses the ball 21 of the ball joint 18. Thereby, strong frictional force is generated between the piston 13 and the ball joint 18. This frictional force is used to restrict the pad unit 12 from undesirably moving when the object is being transported.

In FIG. 3, reference numeral 38 denotes a pin installed between the piston 13 and the cover 17 to prevent the piston 13 from rotating. A slight gap is formed between the pin 38 and the piston 13 so that the pin 38 does not impede the longitudinal movement of the piston 13.

Furthermore, reference numeral 39 denotes a typical shock absorber which is mounted to the cover 17 in the longitudinal direction to absorb impacts applied to the object when it is being transported. Reference numeral 40 denotes a bracket which couples the pad device 30 to a transportation apparatus, such as a robot arm or the like. Reference numeral 41 denotes a silencer mounted to the second end of the vacuum pump 31 adjacent to the air discharge hole 33. However, these elements 38, 39, 40 and 41 are not included in the components constituting the pad device 30 of the present invention.

What is claimed is:

1. A vacuum pad device, comprising:
    a housing having: an inlet port and an outlet port formed through a sidewall of the housing at respectively an upper position and a lower position; a mounting seat formed through a lower end of the housing; and a sealing cover provided on an upper end of the housing;
    a pad unit comprising: a ball joint having a through hole formed in a longitudinal direction thereof; and a suction pad coupled to an end of the ball joint, wherein a ball of the ball joint is seated into the mounting seat of the housing so that the pad unit is rotatably coupled to the housing; and
    a piston provided in the housing such that an outer surface of the piston is in close contact with an inner surface the sidewall of the housing, the piston having a connection hole communicating the outlet port with the through hole, wherein the piston is moved in a longitudinal direction of the housing by pressure of compressed air supplied from the inlet port, thus controlling rotation of the ball joint.

2. The vacuum pad device as set forth in claim 1, further comprising:
    a vacuum pump comprising an axis-symmetric air pump structure and having an air intake hole formed in a first end thereof, an air discharge hole formed in a second end thereof, and an opening formed through a sidewall of the vacuum pump to communicate with an outside air, wherein the vacuum pump is mounted to the housing in such a way that a mounting hole is formed in the housing at a position opposite to the outlet port and the first end and the second end of the vacuum pump are respectively inserted into the mounting hole and the outlet port, and the opening of the vacuum pump communicates with the connection hole of the piston.

3. The vacuum pad device as set forth in claim 1 or 2, wherein the mounting seat has a round surface which is in surface contact with the ball of the ball joint.

4. The vacuum pad device as set forth in claim 1 or 2, wherein the piston controls the rotation of the ball joint in such a way that the piston is moved by the pressure of the compressed air supplied from the inlet port and thus presses the ball of the ball joint.

5. The vacuum pad device as set forth in claim 4, wherein the piston has a round recess such that the piston comes into surface contact with the ball of the ball joint.

6. The vacuum pad device as set forth in claim 1 or 2, wherein a pin is installed between the piston and the sealing cover to prevent the piston from rotating, and a gap is formed between the pin and the piston to allow the longitudinal movement of the piston.

* * * * *